(12) United States Patent
Friedman

(10) Patent No.: US 10,334,987 B2
(45) Date of Patent: Jul. 2, 2019

(54) SYSTEMS AND METHODS FOR A MIXING CONTAINER

(71) Applicant: Adam Friedman, Gainesville, VA (US)

(72) Inventor: Adam Friedman, Gainesville, VA (US)

(*) Notice: Subject to any disclaimer, the term of this patent is extended or adjusted under 35 U.S.C. 154(b) by 763 days.

(21) Appl. No.: 14/814,448

(22) Filed: Jul. 30, 2015

(65) Prior Publication Data
US 2016/0029847 A1 Feb. 4, 2016

Related U.S. Application Data

(60) Provisional application No. 62/030,959, filed on Jul. 30, 2014.

(51) Int. Cl.
*A47J 43/27* (2006.01)

(52) U.S. Cl.
CPC .................................... *A47J 43/27* (2013.01)

(58) Field of Classification Search
CPC .. A47J 43/27; B01F 13/0022; B01F 15/00512
USPC ......................................................... 366/130
See application file for complete search history.

(56) References Cited

U.S. PATENT DOCUMENTS

| 3,820,692 | A | * | 6/1974 | Swett | B65D 47/0895 |
| | | | | | 222/547 |
| D419,369 | S | * | 1/2000 | Naft | D7/391 |
| 2012/0061398 | A1 | * | 3/2012 | Nilsson | A47J 43/27 |
| | | | | | 220/568 |

FOREIGN PATENT DOCUMENTS

DE 202012011362 U1 * 1/2013 ............. A47J 43/14

* cited by examiner

*Primary Examiner* — Marc C Howell
(74) *Attorney, Agent, or Firm* — Symbus Law Group, LLC; Clifford D. Hyra

(57) ABSTRACT

A disposable mixing system includes a lid having an opening and configured to hold contents within a container, a strainer configured to couple with the container and the lid in a position between the container and the lid, where the strainer mixes the contents responsive to shaking the container, and a cap configured to cover the opening of the lid, where at least the lid and the strainer are formed in a unified piece. The system may be manufactured from a single sheet of plastic using thermoforming. The strainer may use flat surfaces and large triangular orifices for efficient mixing and manufacture, while the lid may have a spout sized to prevent clogging and pressure build-up.

20 Claims, 8 Drawing Sheets

SYSTEMS AND METHODS FOR A MIXING CONTAINER

This application claims the benefit of U.S. Provisional Application No. 62/030,959, filed Jul. 30, 2015, which is hereby incorporated by reference in its entirety.

TECHNICAL FIELD

This disclosure relates generally to systems and methods for mixing ingredients in a container. More particularly, this disclosure relates to a disposable mixing system including a strainer, lid, and cap.

BACKGROUND

Conventionally, a mixing device within a container is used to mix a liquid with different ingredients. Initially, a liquid is disposed within a container, and subsequently other liquids or ingredients are disposed within the container. A user may then shake the container to blend the liquids and/or ingredients via the mixing device.

Conventional mixing devices and containers require cleaning after each user. However, even with regular cleaning, it can be difficult to completely remove all of the liquid and or ingredients that are placed within the mixing device and container. If a user is traveling with a mixing device, it may be cumbersome to find locations where the user may clean the mixing device.

Cleaning is time consuming and conventional cups can become very fouled if not cleaned quickly, requiring even more effort to properly clean. Although materials can usually be removed with enough effort, smells can be absorbed into the plastic and persist. Conventional mixing devices also can fail over time (i.e. seals weaken and contents can leak).

Alternatively, liquids and/or ingredients may be purchased pre-mixed as a "Ready-To-Drink" (RTD) beverage within a sealed container. However, RTD mixtures are typically expensive, do not allow a user to choose specific ingredients, specific quantities of ingredients, or specific combinations of ingredients, etc. Furthermore, ingredients within a RTD mixture can be maintained within the RTD mixture for an extended period of time, which may have undesirable effects, require the use of certain preservatives and/or stabilizing agents, etc.

Accordingly, needs exists for improved and efficient methods and systems for beverage-mixing apparatuses.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description. Rather, the scope of the invention is defined by the appended claims.

In certain embodiments, the disclosed embodiments may include one or more of the features described herein.

Embodiments disclosed herein provide systems and methods for a disposable mixing system. The disposable mixing system may be configured to be manufactured via thermoforming, and enable a cost efficient design for disposable use. Utilizing the cost efficient design being manufactured via thermoforming, the disposable mixing system may increase hygiene, convenience, and flexibility of mixing ingredients for users. Embodiments may be designed thinner, lighter, less durable, and less expensive than conventionally shakers because they may be designed for a single use. The thickness of the system may vary depending on the material used, but may in embodiments be 10-20 mils. In one embodiment, the thickness is 18 mils and the material is PET. Materials that can be used include PET (polyethylene terephthalate), HIPS (High Impact Polystyrene), and PVC (polyvinylchloride).

In alternative embodiments, other plastic forming techniques such as injection molding may be used instead of thermoforming. Thermoforming is well suited to thin walled structures, however other plastic forming techniques may be desirable at very high production quantities or for embodiments with more complex shapes, or as such techniques are made more efficient over time.

Elements of the disposable mixing system may be configured to allow liquids, supplements, etc. into a container, cover the container, and mix the contents of the container.

In embodiments, the disposable mixing system may include a lid, a cap, and a strainer, wherein the disposable mixing system is manufactured in a unified piece.

In embodiments, the lid and the cap may be coupled together via a first unifying projection, and the strainer and the lid may be coupled together via a second unifying projection. The first unifying projection may be configured to be bent, twisted, or cut to decouple the cap from the lid. The second unifying projection may be configured to be bent to couple the strainer and the lid.

The lid may be a closure, cover, seal, etc. that is configured to close a container. The lid may have a base with a spout and mount. The spout may be an opening in the lid, wherein a user may pour out liquid, ingredients, supplements, mixtures, etc. (referred to hereinafter collectively and individually as "liquid") disposed within the container. The mount may be configured to secure the lid the container and/or the strainer.

The cap may be configured to cover, seal, etc. the spout positioned on the lid. Responsive to the cap being positioned over the spout, liquid disposed within the container may be secured within the container.

The strainer may be configured to be disposed adjacent to the lid and/or a perimeter of the container. The strainer may be configured to mix liquids disposed within the container responsive to the container vibrating, shaking, pulsating, etc.

Embodiments may be manufactured to be stackable, wherein a first disposable mixing system may be positioned over and adjacent to a second disposable mixing system.

Embodiments may include logos, advertisements, promotions, etc. that are imprinted and/or otherwise added to the containers and/or disposable mixing systems.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

DETAILED DESCRIPTION

Figure 1:
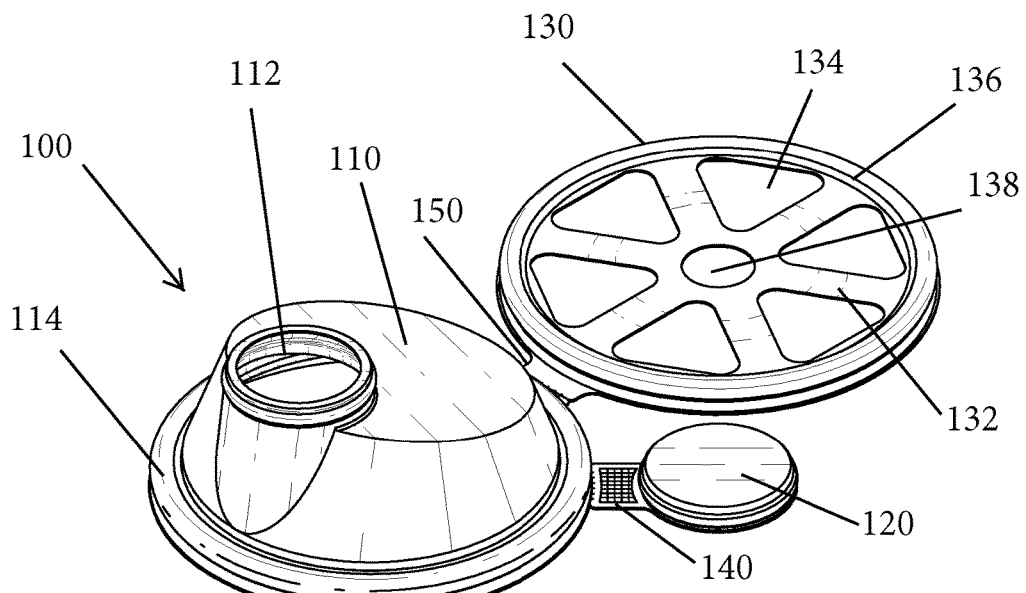
FIG. 1 is a top perspective view of an unassembled disposable mixing system, in an embodiment.

The invention and the various features and advantageous details thereof are explained more fully with reference to the nonlimiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

FIG. 1 is a top perspective view of an unassembled disposable mixing system 100, in an embodiment. Disposable mixing system 100 may be configured to be manufactured via a thermoforming process, wherein disposable mixing system 100 is a unified device. The entire system 100 may be manufactured from a sheet of plastic using thermoforming, without any assembly or other parts, allowing for an extremely efficient manufacturing process and low cost. Elements of disposable mixing system 100 may be configured to allow liquids, supplements, etc. to be placed within a container, to cover the container, and to mix the contents of the container. Disposable mixing system 100 may be utilized to mix a wide range of contents, including different types of liquids, nutritional supplements, powders, flavorings, etc. Furthermore, disposable mixing system 100 may be manufactured as a thin piece of plastic.

Disposable mixing system 100 may include a container (not shown), lid 110, cap 120, strainer 130, first unifying projection 140, and second unifying projection 150.

The container may be a cup, bottle, mug, etc. wherein the container is configured to hold contents. The container may be comprised of plastics, such as polypropylene or polyethylene, or paper, such as a disposable coffee cup. The container may include structural ribs to demark a fluid volume, to provide structural rigidity, and/or to provide improved gripping surfaces. In embodiments, fluids may be disposed within the container to a desired volume, and subsequently supplements, flavoring, etc. may be added.

Lid 110 may be a closure, cover, seal, etc. that is configured to secure the contents of the container within the container. Lid 110 may include a spout 112 and a mount 114.

Spout 112 may be an opening positioned on the top surface of lid 110, where the contents of the container may be poured out of the container. The shape of the spout enables manufacturing by thermoforming while maintaining structural integrity and providing a wide enough opening for comfortable drinking without the need for pressure release.

Because of the large opening, a user need not cover the entire spout with their mouth when drinking, preventing vacuum creation and resulting discomfort and need for periodic breaks to equalize pressure. The spout may be for example about 1" across in its largest dimension. Such a wide spout also prevents supplement or other mixing material from getting clogged in the spout and enables a laminar flow when drinking.

Mount 114 may be positioned on the bottom surface of lid 110, and may be configured to couple lid 110 with the container and/or strainer 130. Mount 114 may include grooves, depressions, notches, etc. that allows lid 110 to be coupled with the container and/or strainer 130. In embodiments, mount 114 may have a series of grooves, notches, and/or other coupling/mating structures for coupling to two or more different sizes of containers.

Cap 120 may be configured to cover, seal, etc. spout 112 positioned on lid 110. Responsive to cap 120 being positioned on spout 112, the contents disposed within the container may not be poured out of spout 112. Cap 120 may be configured to be removably attached to spout 112 (e.g. by mating structures such as grooves on the spout 112 and cap 120), or may fit loosely over spout 112, requiring that it be held in place while the substances within the container are mixed. Where the cap 120 has mating features (see FIG. 6 and description), the cap 120 may be removed for drinking after mixing, and then replaced on the spout 112 to re-seal the container for transportation/storage, to prevent spills and/or for remixing, should settling occur.

Strainer 130 may be a device configured to mix the contents disposed within the container. Strainer 130 may include projections 132 and orifices 134, wherein the projections 132 and orifices 134 may be shaped, sized, and/or positioned in a plurality of different designs. Responsive to contents being placed within the container, disposable mixing system 100 being positioned over the container, and the container and disposable mixing system 100 being shaken, projections 132 and orifices 134 of strainer 130 may be configured to mix the contents within the container.

Strainer 130 is shaped both for easy thermoforming and for highly efficient mixing, while maintaining structural integrity during mixing. As a result, the strainer 130 in some embodiments has flat projections 132 that cover a significant portion of the area within the rim of the strainer 130, for example about 50%. The space between the flat projections 132 may be divided into a number of separate orifices 134, for example four or more.

However, in some embodiments the number of orifices is limited and their size kept relatively large to enable thermoforming. Many small holes, such as a fine grid of square or circular holes, are prohibitively difficult and expensive to thermoform. Therefore, each orifice may be for example at least 1 cm$^2$. For example, in one embodiment there are six triangles, each about 3 cm$^2$, plus or minus 15%. A small number of relatively large triangular holes enables a thin shell structure that maintains structural integrity during mixing and transport while providing abrupt edges to generate turbulent mixing without clogging, while also minimizing manufacturing costs. For example, the orifices may be formed by die, so the more holes there are the more complicated tooling becomes. The substantially similarly-sized triangular orifices as shown distributed evenly around the center of the strainer enable a uniform distribution around the center of the strainer and leave wide spokes for structural rigidity and to provide mixing surfaces.

The orifices 134 may be triangular with rounded corners, including equilateral triangles with rounded corners, and/or circular. In the illustrated embodiment, the orifices 134 include six equilateral triangles with rounded corners evenly distributed around a central circular orifice 138. This design is very effective in mixing drink contents and very efficient to manufacture.

Strainer 130 may also include an interface system 136. Interface system 136 may include a depression, crevice, groove, etc. (referred to hereinafter collectively and individually as "groove") positioned on a first face of strainer 130, and projection, notch, etc. (referred to hereinafter collectively and individually as "projection") positioned on a second face of strainer 130. In embodiments, the groove on the first face of strainer 130 and the projection on the second face of strainer 130 may be positioned proximate to a perimeter of strainer 130. The groove on the first face of strainer 130 may be configured to couple with the lip of the container to secure strainer 130 and the container. The projection on the second face of strainer 130 may be configured to couple strainer 130 with mount 114 of lid 110 to secure strainer 130 with lid 110. Therefore, interface system 136 may be configured to couple the container, strainer 130, and lid 110 to unify disposable mixing system 100. To secure the lid and strainer using the aforementioned mating structures, a user may force the strainer and lid together with mating structures aligned. As the lid and strainer are formed of flexible material, the groove and/or area around the groove will stretch due to the force applied, until it slips over the corresponding projection. Subsequently, the interface between the groove and projection secures the two parts together, unless sufficient force is exerted in the opposite direction to reverse the process.

In embodiments, interface system 130 of strainer 130 may be sized to fit on standard paper cups with a top diameter of approximately 90 mm (~3.5 in), which often come in 20 oz and 24 oz configurations. Other embodiments may be sized for other containers. As with the lid 110, strainer 130 in embodiments may have multiple sets of grooves and projections to accommodate differently-sized containers.

The shape of the strainer interface system 136 relative to the container on which it is to be mounted is important for maintaining a strong connection that prevents leaks and keeps the lid on during shaking/mixing. In embodiments, the diameter of the strainer groove is very close to the outer diameter of the container lip, and in some embodiments is slightly smaller so that it is in a stretched condition when in place over the container lip. Furthermore, the strainer interface system 136 in embodiments has a 2 mm return, meaning that after the groove wraps over the lip of the container, it continues downwards into the container for 2 mm to help prevent leaks.

First unifying projection 140 may be configured to couple lid 110 and cap 120. First unifying projection 140 may be a thin, pliable piece of plastic. In embodiments, first unifying projection 140 may be configured to be bent, cut, etc. to break. It may be very thin and/or have a notch for easy tearing by hand (e.g. with 5-10 lbs of force). Responsive to first unifying projection 140 breaking, cap 120 may be decoupled from lid 110, and cap 120 may be positioned over spout 112.

Second unifying projection 150 may be configured to couple lid 110 and strainer 130. Second unifying projection 150 may similarly be very thin and/or perforated (as shown), notched etc. for easy tearing. Second unifying projection 150 may be torn at perforations 152 (FIG. 2) to separate the strainer 130 from lid 110 and then positioned over and forced down onto the rim of a container to connect the strainer to the container. Subsequently the lid 110 may be positioned over the strainer and pushed down onto the interface system 136 of the strainer to couple the mount 114 of lid 110 with interface system 136 of strainer 130 and couple the lid 110, strainer 130 and container.

Second unifying projection 150 may also be a thin pliable piece of plastic or living hinge, wherein second unifying projection 150 may be bent to align the projection on the second face of strainer 130 with mount 114 on lid 110. Accordingly, second unifying projection 150 may be an axis which strainer 130 may be rotated about, in order to be positioned adjacent to and under lid 110. In such an embodiment, the strainer 130 may have the opposite orientation as that shown in the figures, such that when rotated 180° about the living hinge 150, the interface system 136 lines up for mating with mount 114. Alternatively, the living hinge 150 may be flexible enough to allow both 180° rotation about the axis of the living hinge, but also about a perpendicular (twist) axis, such that the strainer 130 after the dual rotations ends up in its original orientation, but positioned directly below the lid 110.

The unassembled mixing system 100 is stackable in some embodiments such as the one shown, the lid mount 114 and interface system 136 having the same height as the cap 120 and the lid 110 reducing in cross-section as it increases in height. Thus a plurality of such systems 100 may be conveniently stacked and transported in a small volume and minimal amount of packaging.

Figure 2:
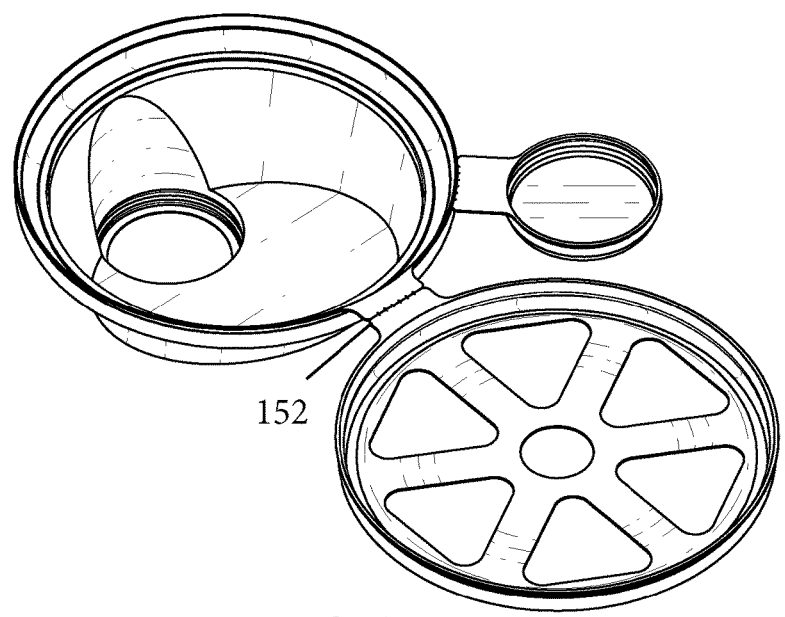
FIG. 2 is a bottom perspective view of an unassembled disposable mixing system, in an embodiment.

FIG. 2 is a bottom perspective view of an unassembled disposable mixing system, in an embodiment.

Figure 3:
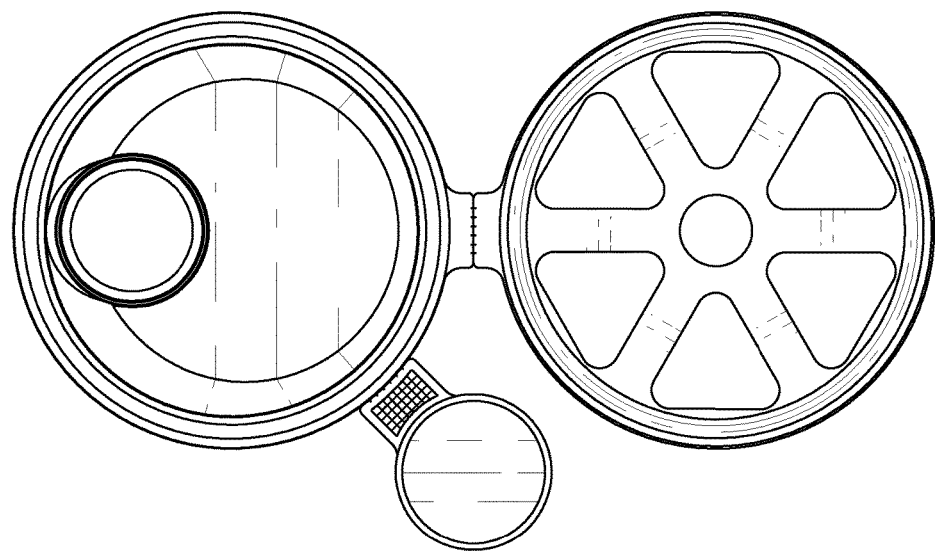
FIG. 3 is a top view of an unassembled disposable mixing system, in an embodiment.

FIG. 3 is a top view of an unassembled disposable mixing system, in an embodiment.

Figure 4:
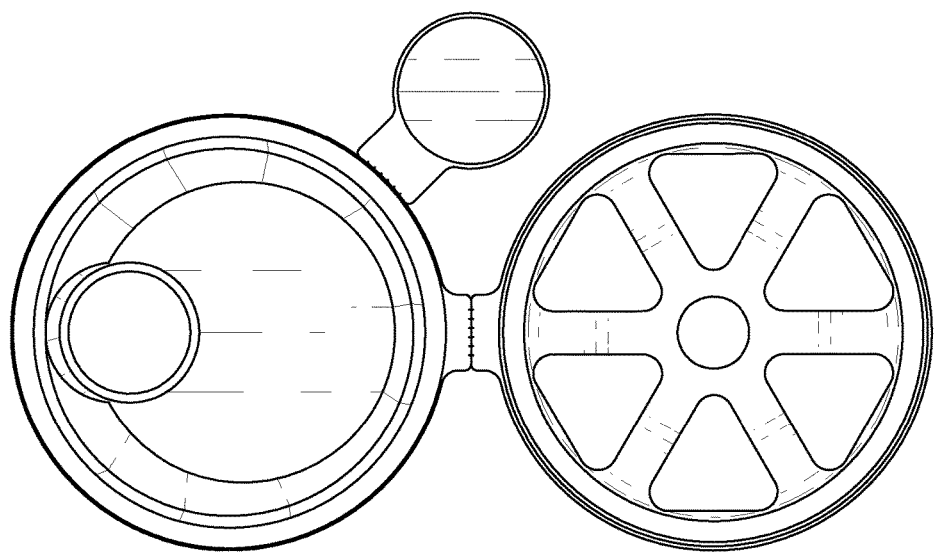
FIG. 4 is a bottom view of an unassembled disposable mixing system, in an embodiment.

FIG. 4 is a bottom view of an unassembled disposable mixing system, in an embodiment.

Figure 5:
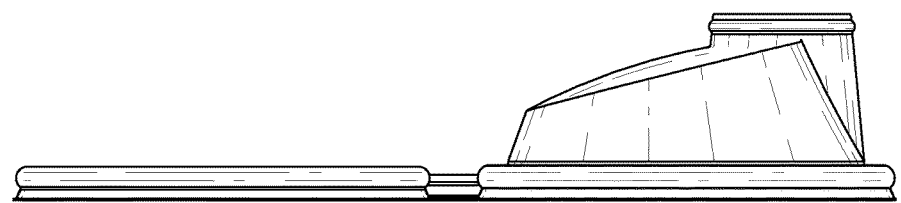
FIG. 5 is an opposite-cap side view of an unassembled disposable mixing system on the side opposite the cap, in an embodiment.

FIG. 5 is a opposite-cap side view of an unassembled disposable mixing system on the side opposite the cap, in an embodiment.

Figure 6:
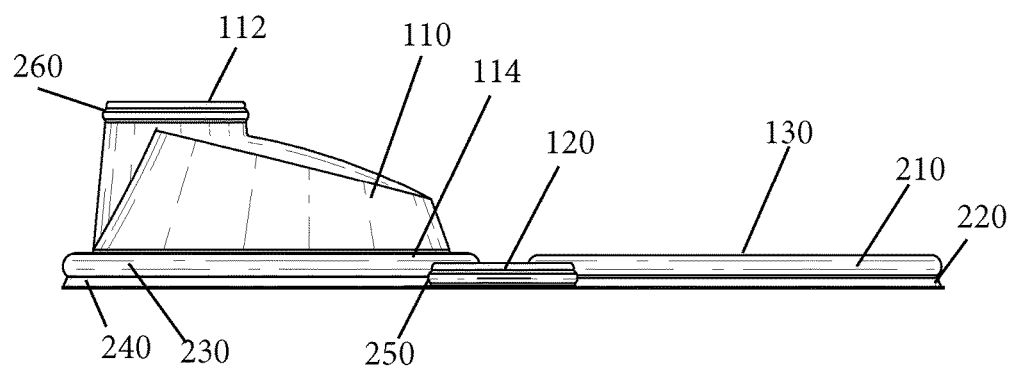
FIG. 6 is a cap side view of an unassembled disposable mixing system, in an embodiment.

FIG. 6 is a cap side view of an unassembled disposable mixing system, in an embodiment. In embodiments, the circumference of the strainer 130 includes a ridge 210 and flare 220, which correspond to ridge 230 and flare 240 on the circumference of lid 110. When second unifying projection and living hinge 150 is bent in half, strainer 130 is rotated 180° and sits directly below lid 110. As the peak of ridge 210 is wider than the valley between ridge 230 and flare 240, some force must be exerted on the strainer 130 to snap it into place, after which ridge is 210 seated within ridge 230 and flare 220 is seated within flare 240. The strainer/lid combination can then be mounted on the lip of a container such as a coffee cup, where the lip is slightly wider than the valley between ridge 210 and flare 220. By exerting some force on the cup and strainer/lid to push them together, the lip of the container will push past the valley and snap into the area within circumferential ridges 220, 240.

Also shown is cap 120 having circumferential ridge 250, which corresponds to the shape of the spout 112 having circumferential ridge 260. Since the sides of the cap 120 adjacent to the ridge 250 are not as wide as ridge 260 on the spout 112, some force must be exerted on cap 120 to snap it into place on spout 112, with ridge 250 covering and directly adjacent mating ridge 260.

Figure 7:
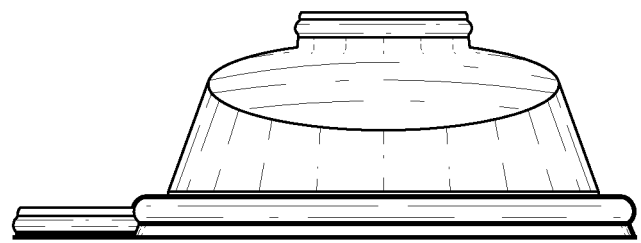
FIG. 7 is a rear view of an unassembled disposable mixing system, in an embodiment.

FIG. 7 is a rear view of an unassembled disposable mixing system, in an embodiment.

Figure 8:
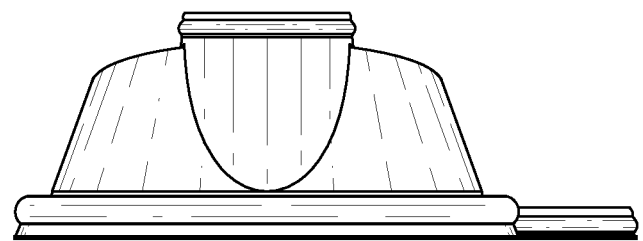
FIG. 8 is a front view of an unassembled disposable mixing system, in an embodiment.

FIG. 8 is a front view of an unassembled disposable mixing system, in an embodiment.

Figure 9:
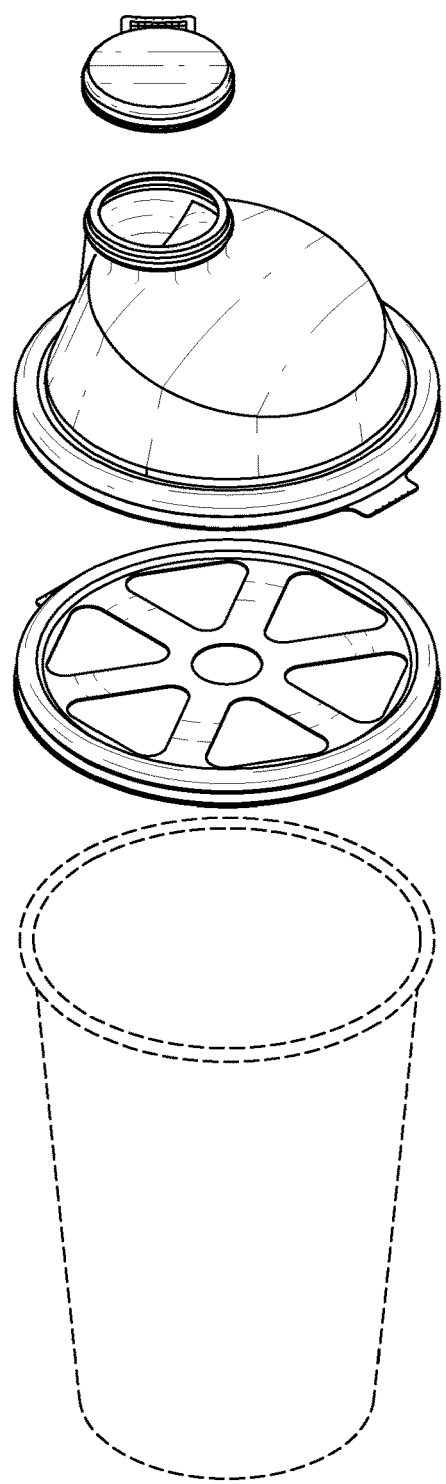
FIG. 9 is an exploded perspective view of a disposable mixing system shown above a cup, in an embodiment.

FIG. 9 is an exploded perspective view of a disposable mixing system shown above a cup, in an embodiment. The cup is shown in dashed lines to indicate that it is environmental, and that any differently shaped container may be substituted as long as it can interface with the strainer.

Figure 10:
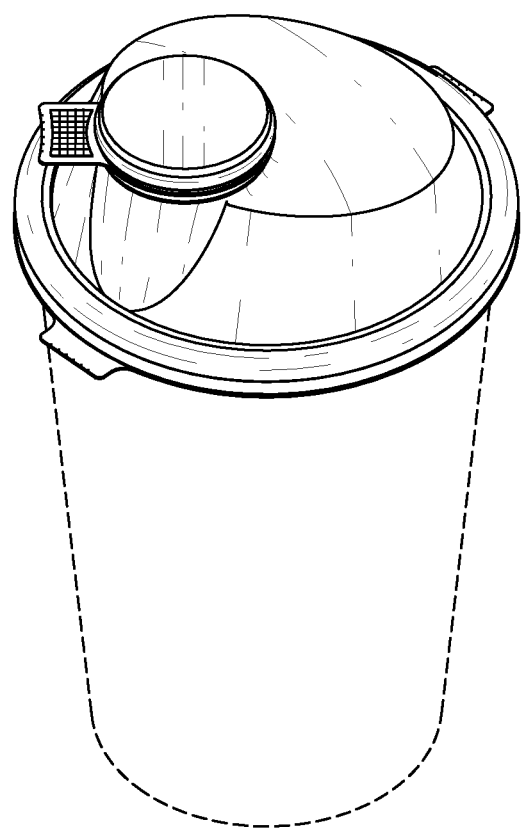
FIG. 10 is a top perspective view of an assembled disposable mixing system on a cup, in an embodiment.

FIG. 10 is a top perspective view of an assembled disposable mixing system on a cup, in an embodiment. The cup is shown in dashed lines to indicate that it is environmental, and that any differently shaped container may be substituted as long as it can interface with the strainer.

Figure 11:
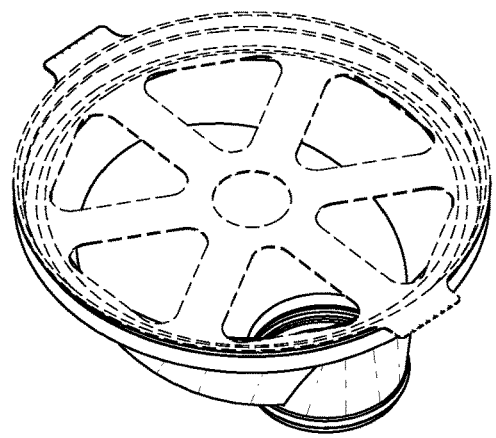
FIG. 11 is a bottom perspective view of an assembled disposable mixing system, in an embodiment.

FIG. 11 is a bottom perspective view of an assembled disposable mixing system, in an embodiment. The cup and strainer are shown in dashed lines to indicate that they are here environmental, and that any differently shaped container and strainer may be substituted as long as they can interface with the lid.

Figure 12:
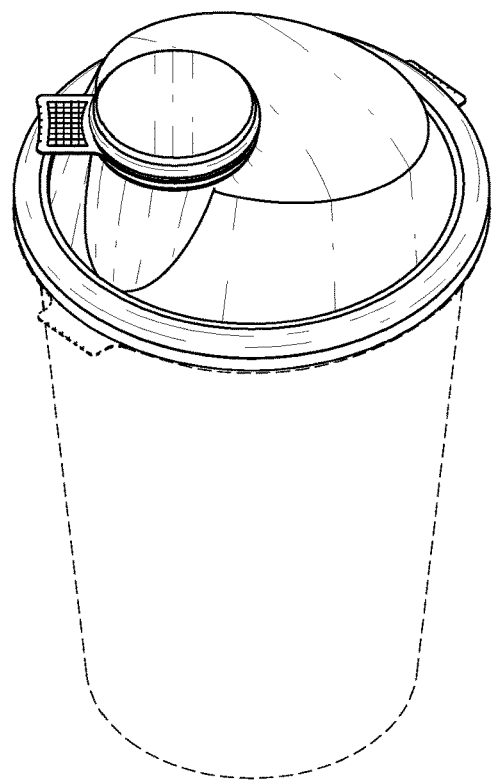
FIG. 12 is a top perspective view of an assembled disposable mixing system on a cup, in an embodiment.

FIG. 12 is a top perspective view of an assembled disposable mixing system on a cup, in an embodiment. The cup and strainer are shown in dashed lines to indicate that they are here environmental, and that any differently shaped container and strainer may be substituted as long as they can interface with the lid.

Figure 13:
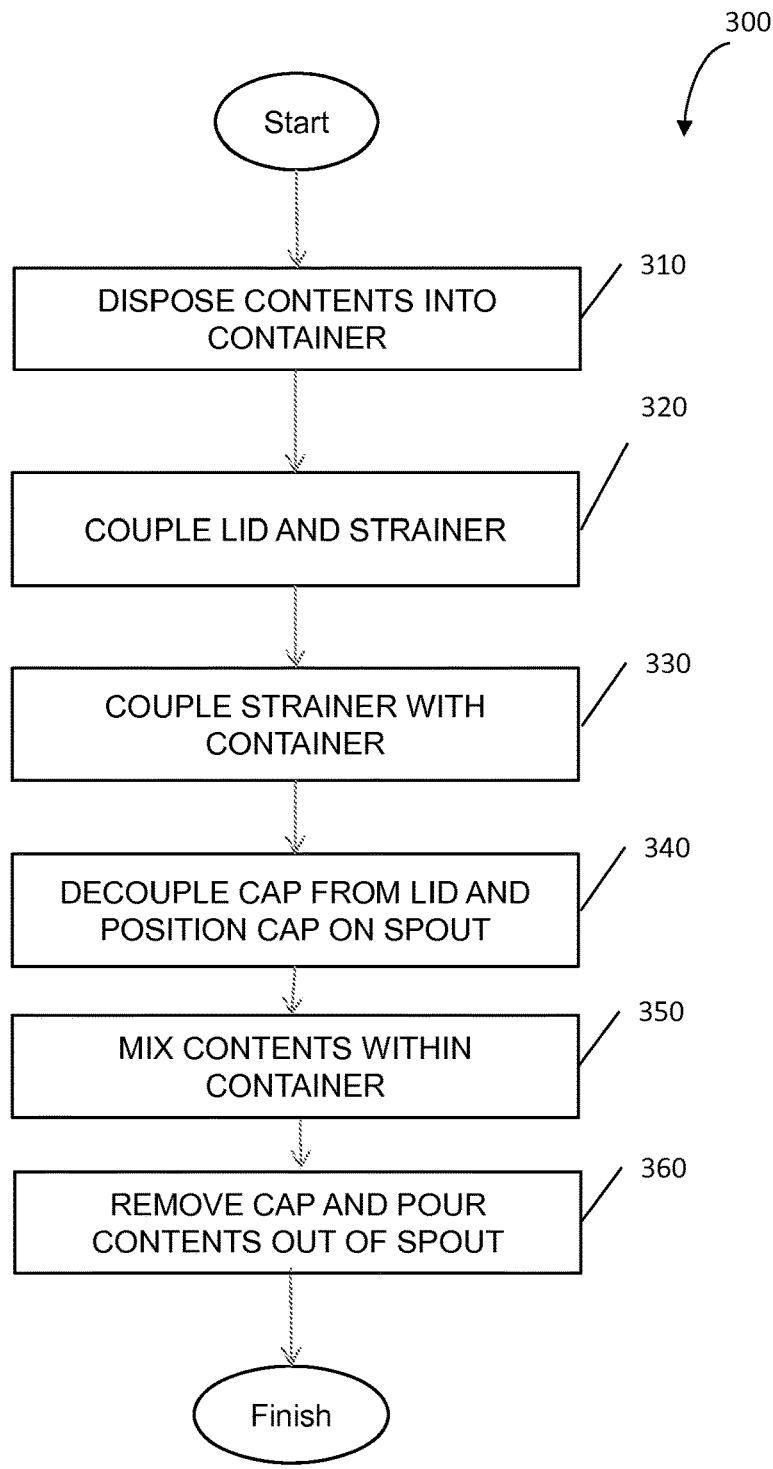
FIG. 13 depicts an embodiment of a method for utilizing a disposable mixing system.

FIG. 13 depicts a method 300 for utilizing a disposable mixing system, according to an embodiment. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

At operation 310, contents may be disposed into a container. The contents may include liquids, nutritional supplements, flavorings, etc.

At operation 320, a strainer and a lid of a disposable mixing system may be coupled together. The strainer may be coupled to the lid by rotating the strainer about an axis to be positioned below and adjacent to the lid.

At operation 330, a lower face of the strainer may be coupled to a perimeter of the container. The lower face of the strainer may be coupled to the container by snapping a groove on the lower face of the strainer with the perimeter of the container, via a thread joining mechanism, and/or any other known coupling techniques. In embodiments, operation 330 may take place before operation 320.

At operation 340, a cap may be decoupled from the disposable mixing system, and positioned over a spout on the lid. By covering the spout on the lid with the cap, the contents within the container and the lid may be sealed.

At operation 350, the container may be moved, e.g. shaken, vibrated, gyrated, etc. Responsive to movement of the strainer, the contents positioned within the container may contact the strainer and be mixed.

At operation 360, the cap may be removed and the mixed contents of the container may be poured out of the spout (for example into a user's mouth or into another container). Subsequently, the disposable mixing system may be removed from the container and thrown away, or thrown away with the container.

In some embodiments, a method of use involves the following sequence of steps: add contents to cup; attach strainer to the cup; fold lid over to snap onto strainer; detach cap and attach to spout; mix; and then detach the cap from the spout for consumption.

In the foregoing specification, embodiments have been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

The invention encompasses every possible combination of the various features of each embodiment disclosed. It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A disposable mixing system comprising:
    a lid comprising an opening and configured to hold contents within a container;
    a strainer configured to couple with the container and the lid in a position between the container and the lid, wherein the strainer mixes the contents responsive to shaking the container; and
    a cap configured to cover the opening of the lid;
    wherein at least the lid and the strainer are formed in a unified piece wherein the strainer is configured to snap onto a perimeter of the container;
    wherein the strainer is coupled to the lid via a first unifying projection and/or the cap is coupled to the lid and/or the strainer via a second unifying projection, the first and/or the second unifying projection comprising notches.

2. The system of claim 1, wherein the strainer is coupled to the lid via a first unifying projection.

3. The system of claim 2, wherein the first unifying projection is a living hinge configured to be bent to position the strainer against the underside of the lid.

4. The system of claim 3, wherein the first unifying projection is made of a thin material and is perforated.

5. The system of claim 2, wherein the cap is coupled to the lid and/or the strainer via a second unifying projection.

6. The system of claim 5, wherein the second unifying projection is made of a thin, pliable material and contains notches.

7. The system of claim 1, wherein the lid, strainer, and cap are made from a thin, pliable plastic material and manufactured via thermoforming.

8. The system of claim 1, wherein the lid, strainer and cap are formed in a unified piece.

9. The system of claim 1, wherein the cap and the lid opening comprise mating structures for releasably securing the cap over the opening.

10. The system of claim 9, wherein the mating structures comprise one or more projections and corresponding mating recesses.

11. The system of claim 1, wherein the opening is at least 1 inches in its largest dimension.

12. The system of claim 1, wherein the strainer comprises an inner peripheral groove configured to snap onto a projecting rim of the container.

13. The system of claim 1, wherein the lid and strainer comprise corresponding aligned mating structures formed of flexible material that secure the lid and strainer together.

14. The system of claim 13, wherein the corresponding mating structures comprise one or more projections and one or more corresponding recesses.

15. The system of claim 1, wherein the strainer comprises a plurality of flat surfaces and a plurality of orifices between the surfaces, wherein each orifice is at least 1 cm$^2$.

16. The system of claim 15, wherein the plurality of orifices comprise a plurality of triangular orifices oriented symmetrically around a center of the strainer.

17. A mixing container method, comprising:
    providing a lid comprising an opening and configured to hold contents within a container;
    providing a strainer configured to couple with the container and the lid in a position between the container and the lid, wherein the strainer mixes the contents responsive to shaking the container; and
    providing a cap configured to cover the opening of the lid;
    wherein at least the lid and the strainer are formed in a unified piece wherein the strainer is configured to snap onto a perimeter of the container;

wherein the strainer includes a groove that wraps over a lip of the container;
separating the strainer, the cap, and the lid;
placing contents to be mixed inside the container;
placing the strainer over a container opening and pressing the strainer down onto the container opening, wrapping the groove of the strainer over the lip of the container and securing the strainer over the container opening;
placing the lid over the strainer and pressing the lid down onto the strainer, forcing one or more mating structures on the lid to securely mate with corresponding mating structures on the strainer, thereby securing the lid over the strainer;
placing the cap over the lid opening and pressing the cap down onto the lid opening, forcing one or more mating structures on the cap to securely mate with corresponding mating structures on the lid opening, thereby securing the cap over the lid opening; and
shaking the container, thereby mixing the contents with the strainer.

18. The method of claim 17, wherein the mating structure on the strainer comprises an outer peripheral projection and the corresponding mating structures on the lid comprises an inner periphery recess configured to snap over the outer peripheral projection on the strainer, wherein the mating structure on the lid opening comprises an outer peripheral projection and the corresponding mating structures on the cap comprises an inner periphery recess configured to snap over the outer peripheral projection on the lid opening.

19. A disposable mixing system comprising:
a lid comprising an opening and configured to hold contents within a container;
a strainer configured to couple with the container and the lid in a position between the container and the lid, wherein the strainer mixes the contents responsive to shaking the container; and
a cap configured to cover the opening of the lid;
wherein at least the lid and the strainer are formed in a unified piece wherein the strainer is configured to snap onto a perimeter of the container;
wherein the strainer includes a groove that wraps over a lip of the container.

20. A disposable mixing system comprising:
a lid comprising an opening and configured to hold contents within a container;
a strainer configured to couple with the container and the lid in a position between the container and the lid, wherein the strainer mixes the contents responsive to shaking the container; and
a cap configured to cover the opening of the lid;
wherein at least the lid and the strainer are formed in a unified piece wherein the strainer is configured to snap onto a perimeter of the container;
wherein the strainer includes a groove that snaps onto a standard paper cup having a top diameter of approximately 90 mm.

* * * * *